United States Patent [19]

Beavon

[11] 4,038,036
[45] July 26, 1977

[54] APPARATUS FOR THE PRODUCTION OF SULFUR FROM MIXTURES OF HYDROGEN SULFIDE AND FIXED NITROGEN COMPOUNDS

[75] Inventor: David K. Beavon, Pasadena, Calif.

[73] Assignee: The Ralph M. Parsons Company, Pasadena, Calif.

[21] Appl. No.: 685,981

[22] Filed: May 13, 1976

Related U.S. Application Data

[62] Division of Ser. No. 506,305, Sept. 16, 1974, Pat. No. 3,970,743.

[51] Int. Cl.² ............ B01J 1/00; C01B 17/04; C01B 17/06
[52] U.S. Cl. ............................ 23/262; 23/277 R; 423/574 R
[58] Field of Search ............ 23/262, 277 R, 277 C; 423/574 G

[56] References Cited

U.S. PATENT DOCUMENTS

| | | | |
|---|---|---|---|
| 2,550,676 | 5/1951 | Dalin | 23/262 |
| 2,650,154 | 8/1953 | Anderson | 423/574 G |
| 2,808,317 | 10/1957 | Schmalenbach et al. | 23/262 |
| 2,851,337 | 9/1958 | Heller | 23/277 R X |
| 2,934,410 | 4/1960 | Smith | 23/277 R |
| 2,945,748 | 7/1960 | Magill | 423/574 G X |
| 3,150,922 | 9/1964 | Ashley | 23/288 FB UX |
| 3,186,806 | 6/1965 | Stiles | 23/288 FB |
| 3,355,254 | 11/1967 | Hoskinson | 23/277 C |
| 3,407,040 | 10/1968 | Kunkel | 423/574 G |
| 3,456,603 | 7/1969 | Studler | 23/277 C X |
| 3,503,714 | 3/1970 | Lang | 23/277 C X |
| 3,518,056 | 6/1970 | Klett | 423/574 G |
| 3,563,709 | 2/1971 | Staud et al. | 23/277 R |
| 3,657,878 | 4/1972 | Kaufmann | 23/277 C X |
| 3,723,068 | 3/1973 | McIlroy et al. | 23/262 |
| 3,771,969 | 11/1973 | Scheitlin | 23/288 FB |
| 3,822,341 | 7/1974 | Smith | 423/574 G |
| 3,860,697 | 1/1975 | Palm | 423/574 G |
| 3,893,810 | 7/1975 | Lientz | 23/277 C |

*Primary Examiner*—Barry S. Richman
*Attorney, Agent, or Firm*—Christie, Parker & Hale

[57] ABSTRACT

To permit the processing of hydrogen sulfide-fixed nitrogen compound feed streams, e.g. $H_2S$—$NH_3$ mixtures without causing plugging problems usually encountered in a Claus sulfur plant due to the formation of solid nitrogen sulfur salts, a first hydrogen sulfide feed containing substantial quantities of fixed nitrogen compounds, a portion of a second hydrogen sulfide feed essentially free of fixed nitrogen compounds and air are combined in a first thermal reaction zone where the amount of oxygen present is sufficient to achieve a high flame temperature for essentially complete conversion of the fixed nitrogen compounds to inert nitrogen, but insufficient to consume all of the hydrogen sulfide present. The effluent of the first reaction zone is combined with the balance of the second hydrogen sulfide feed in a second thermal reaction zone where hydrogen sulfide and sulfur dioxide react to form sulfur. After sulfur condensation, the gas stream is passed to the conventional catalytic Claus conversion stage zone. There is also provided an improved reaction furnace for use in the process.

9 Claims, 7 Drawing Figures

APPARATUS FOR THE PRODUCTION OF SULFUR FROM MIXTURES OF HYDROGEN SULFIDE AND FIXED NITROGEN COMPOUNDS

CROSS REFERENCE TO RELATED APPLICATIONS

This is a division of application Ser. No. 506,305, filed Sept. 16, 1974 now U.S. Pat. No. 3,970,743.

BACKGROUND OF THE INVENTION

The present invention is directed to the elimination of problems encountered in the feed of hydrogen sulfide gas streams containing fixed nitrogen compounds, i.e. $NH_3$ and HCN, to the modified Claus process for sulfur production.

For reference purposes, FIG. 1 illustrates a typical Claus sulfur plant which includes a thermal reaction stage where hydrogen sulfide is first oxidized to sulfur dioxide and water, and where a portion of the formed sulfur dioxide is combined with unconverted hydrogen sulfide to form sulfur and water. Both reactions are exothermic allowing steam generation for process needs. As much as 60% of the sulfur formed is in the thermal reaction stage.

This is followed by two or more catalytic Claus conversion stages where one mole of sulfur dioxide is combined with two moles of hydrogen sulfide to yield additional sulfur. The exothermic heat of reaction is removed between each stage to protect the catalyst employed.

Any residual sulfur which evades production is incinerated and vented to the atmosphere or the tail stream is processed for sulfur recovery, such as by the process of U.S. Pat. No. 3,752,877 issued to me.

Hydrogen sulfide for feed to the process is generated from many sources. Some which may be mentioned are the processing or refining of petroleum crudes, tar sands, bitumen and shale oil, and from the conversion of coal to gases or liquids. The hydrogen sulfide is generally formed by hydrogenation of sulfur compounds in the starting material. At the same time, ammonia ($NH_3$) and hydrocyanic acid (HCN) may be and are often formed from nitrogen compounds present or introduced.

Ammonia and HCN are quite soluble in water, the ammonia making hydrogen sulfide more soluble. When water containing the extracted components is steam-stripped, the stripped-out gases contain $H_2S$, $NH_3$, HCN, and water vapor as well as carbon dioxide.

The gas streams stripped from the absorption solutions may contain from 10 to 30 or more mole percent fixed nitrogen compounds calculated as ammonia.

It is known that Claus units as described above can operate satisfactorily with feed gas containing up to about 0.5 percent or possibly 1 percent by volume $NH_3$. With higher concentrations of $NH_3$, however, serious difficulties have been encountered in operation of the Claus plant. These difficulties are caused by formation of solid nitrogen-sulfur salts such as ammonium sulfate and ammonium hydrosulfate, and manifested by plugging of the catalyst beds, sulfur condensers and the drain pipes conveying sulfur from the condensers.

Hydrogen cyanide may be considered in the same light as $NH_3$, since it is readily converted to $NH_3$ in the sulfur plant reaction furnace by reactions such as:

$$HCN + H_2O \rightarrow NH_3 + CO \qquad (1)$$

Ammonia is relatively stable under normal operating conditions for a modified Claus sulfur plant such as illustrated in FIG. 1. The thermal reaction zone temperature usually is in the range of 1,900° F to 2,300° F, at which the rate of thermal decomposition of $NH_3$ by the reaction:

$$2 NH_3 \rightarrow N_2 + 3 H_2 \qquad (2)$$

is relatively low. Therefore, a major part of the $NH_3$ passes unchanged through the thermal reaction zone at the usual operating temperatures.

In the catalytic conversion zone of the Claus plant, temperatures are usually lower than about 750° F, and the catalyst is ineffective for promoting reaction (2). Since complete and absolute avoidance of sulfur trioxide formation by reactions such as:

$$3 SO_2 \rightarrow S + 2 SO_3 \qquad (3)$$

is industrially impractical, the undecomposed $NH_3$ reacts by, e.g. equation (4), to form solid nitrogen-sulfur salts in the zones of lower temperature:

$$NH_3 + SO_3 + H_2O \rightarrow NH_4HSO_4 \qquad (4)$$

It has been widely experienced that conventional Claus plants, as illustrated by FIG. 1, cannot tolerate more than about 0.5 mole percent $NH_3$ in the feed gas. A conventional plant would be expected to have serious plugging problems due to formed solid nitrogen-sulfur salts within a few days, if operated on feed gas containing, for example, 5 percent ammonia as such or as hydrogen cyanide.

Better results have been achieved by me in dividing the $H_2S$ feed gas into two streams—one rich in $NH_3$, the other essentially free of $NH_3$, and dividing the thermal reaction stage into a cylindrical furnace having two spaced feed inlets. The ammonia rich feed, with all of the required oxygen, as air, is introduced into the first feed inlet, where a high reaction temperature was maintained by reactions such as:

$$2 H_2S + 3 O_2 \rightarrow 2 SO_2 + 2 H_2O \qquad (5)$$

$$2 SO_2 + O_2 \rightarrow 2 SO_3 \qquad (6)$$

$$2 NH_3 + 32 O_2 \rightarrow N_2 + 3 H_2O \qquad (7)$$

and for the reaction $$2 H_2S + O_2 \rightarrow 2 H_2O + 2S \qquad (8)$$

In this arrangement reaction flame temperatures increase in proportion to the amount of hydrogen sulfide-fixed nitrogen compound mixture fed to the first feed zone. When all of the mixture containing the fixed nitrogen compounds is added with some hydrogen sulfide essentially free of fixed nitrogen compounds, temperatures increase as the stoichiometric ratio of oxygen for conversion of essentially all of the hydrogen sulfide to sulfur dioxide is reached. At this point flame temperature reaches about 3100° F. While ample for ammonia decomposition, the temperature approaches the point of refractory firebrick breakdown.

Independent of the temperature realized in the flame zone adjacent the first feed inlet, the balance of the feed was fed to the second feed inlet of the furnace creating a second reaction zone where the reaction products from the first feed are mixed with the second feed to promote reactions such as:

$$3 H_2S + SO_2 \rightarrow 2S + 2 H_2O \qquad (9)$$

$$3 H_2S + SO_3 \rightarrow 4S + 3 H_2O \qquad (10)$$

Temperature is reduced with an attendant reduction in sulfur trioxide formation.

An industrial plant operated in the manner described above only proved moderately successful. Initially, there was recovered about 96.5% of feed sulfur as salable elemental sulfur. After about 3 months of operation, however, plugging of the final catalytic converter and sulfur condenser was noted. Within one year sulfur recovery reduced to about 94.5%. Sulfur loss in the tail gas, unless treated, as $SO_2$ increased from 3.5 to 5.5% some 57% over the starting rate of sulfur loss. Plugging of condensers and drain pipes occurred on a continuing basis.

SUMMARY OF THE INVENTION

According to the present invention, there is provided an improved Claus process for sulfur production which permits continuous operation based on a feed of a mixture of hydrogen sulfide and fixed nitrogen compounds.

The invention is based on the use of a thermal reaction stage providing two separate thermal reaction zones in series. To the first thermal reaction zone, where oxidation occurs, there is fed all of a first hydrogen sulfide feed containing substantial quantities of fixed nitrogen compounds, a portion of a second hydrogen sulfide feed essentially free of fixed nitrogen compounds and a source of oxygen, normally air. It is essential that the total oxygen supply be less than that required to convert all of the hydrogen sulfide to sulfur dioxide and the total feed is adjusted to maintain a temperature between about 2,500° and about 3,000° F. Depending on the composition of the first hydrogen sulfide feed, from 33 to about 66 percent and preferably from about 33 to about 50 percent of the total hydrogen sulfide supplied to the thermal reaction stage is fed to the first thermal reaction zone.

The reaction products of the first thermal reaction zone are combined with the balance of the second hydrogen sulfide feed gas stream in the second thermal reaction zone operated at a lower temperature than the first where hydrogen sulfide and sulfur dioxide react to form sulfur.

Operating the first thermal conversion zone with a deficiency of oxygen has been found to prevent the formation of plugging solid nitrogen-sulfur salts due to essentially complete conversion of the fixed nitrogen compounds to inert nitrogen, while the second zone operated in combination with the first materially reduces the formation of sulfur trioxide or aids in thermally converting formed sulfur trioxide to sulfur dioxide.

The effluent from the second thermal zone, after sulfur removal, can be safely passed to a Claus catalytic conversion zone without fear of plugging due to the formation of solid nitrogen-sulfur salts. Sulfur trioxide formation is reduced to levels where sustained overall conversion efficiencies of 97.0% can be achieved.

There is also provided in accordance with the practice of this invention an improved thermal reactor for use in the process of this invention. The improved thermal reactor consists of two thermal reaction zones in series, the first for the reaction of hydrogen sulfide and oxygen, and the second for the reaction of the formed sulfur dioxide with the second feed of hydrogen sulfide. The two reaction zones are separated by a partition formed by a pair of spaced apertured walls, the apertures of which are connected by a gas flow conduit communicating with the first and second thermal reaction zones.

There is further provided a means to introduce the second feed of hydrogen sulfide to the conduit for intimate turbulent mixing with the reaction product gas stream from the first thermal reaction zone passing to the second thermal reaction zone.

Preferably, velocities through the gas flow conduit are at least about 30 ft. per second and the cross-sectional area of the gas flow conduit is dimensionally based on the design feed rate to achieve this velocity.

In this construction, one of the walls forming the partition and facing the interior of the first thermal reactor serves to reradiate heat back to the first thermal reactor zone to maintain high reaction temperatures in the first thermal reaction and at the same time reducing heat losses to the second thermal reaction zone and the waste heat boiler.

The preferred means for introducing the second hydrogen sulfide stream to the improved thermal reactor of this invention consists of a plurality of openings in the conduit surrounded by a manifold, which may be formed of the exterior wall of the thermal reactor, to which the second stream of hydrogen sulfide is fed. The hydrogen sulfide enters the plurality of openings for intimate admixing with the gas stream passing in the conduit from the first thermal reaction zone to the second thermal reaction zone.

It is also preferred in the construction of the reactor that the feed gas stream to the first thermal reaction zone consists of a mixture of hydrogen sulfide and oxygen formed external of the reactor and which enters the reactor tangentially to a wall surface thereof, in a plane approximate the normal of the axis of the reactor. Feed velocity should be high, at least 50 ft. per second and preferably 100 ft. per second, to assure that localized concentrations of oxygen will not occur which promote the formation of sulfur trioxide.

THE DRAWINGS

DESCRIPTION

According to the present invention, there is provided an improvement to the Claus process for sulfur manufacture which enables continuous operation based on the feed of hydrogen sulfide containing substantial quantities of fixed nitrogen compounds.

Figure 2:
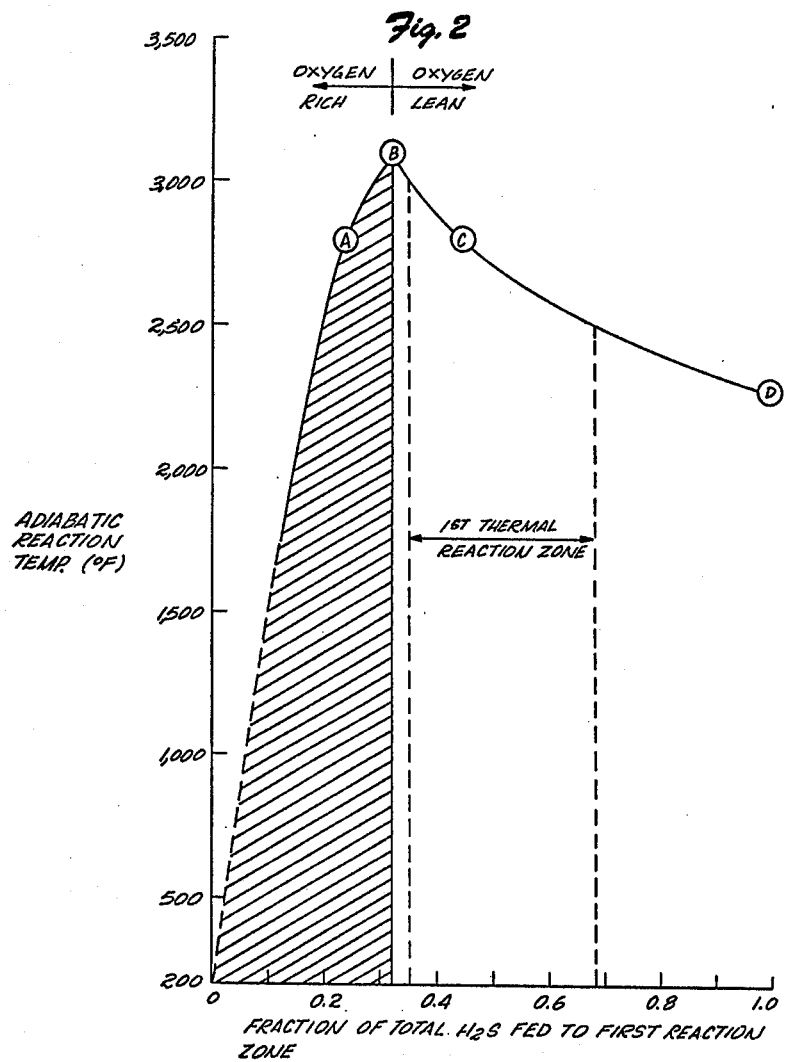
FIG. 2 illustrates the preferred operating conditions for the first thermal conversion zone for a feed base equimolar quantities of ammonia, hydrogen sulfide and water.
Figure 3:
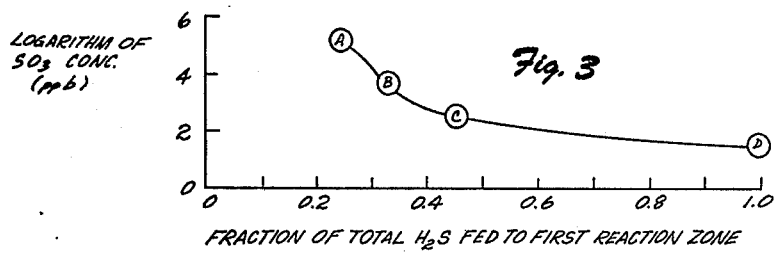
FIG. 3 illustrates a typical sulfur trioxide effluent as a function of total feed of the hydrogen sulfide gas stream where a portion of the feed contains fixed nitrogen compounds.

The hydrogen sulfide feed gases containing substantial quantities of fixed nitrogen compounds to be processed in accordance with the practice of this invention as those which contain fixed nitrogen compound, i.e. ammonia, hydrogen cyanide, or mixtures thereof in concentration too great to be employed in a conventional Claus plant. Typically, such gas streams contain about 1% and more typically from about 5 to about 50 mole percent fixed nitrogen compounds. For convenience, the ensuing discussion as it pertains to FIGS. 2 and 3 is for a gas stream containing about equimolar quantities of hydrogen sulfide, ammonia and water.

The hydrogen sulfide feed gas streams essentially free of fixed nitrogen compounds are those which can be fed to a simple Claus plant without presenting operational problems, i.e. those containing less than about 1 mole percent and preferably less than about 0.5 mole percent fixed nitrogen compounds.

Figure 1:
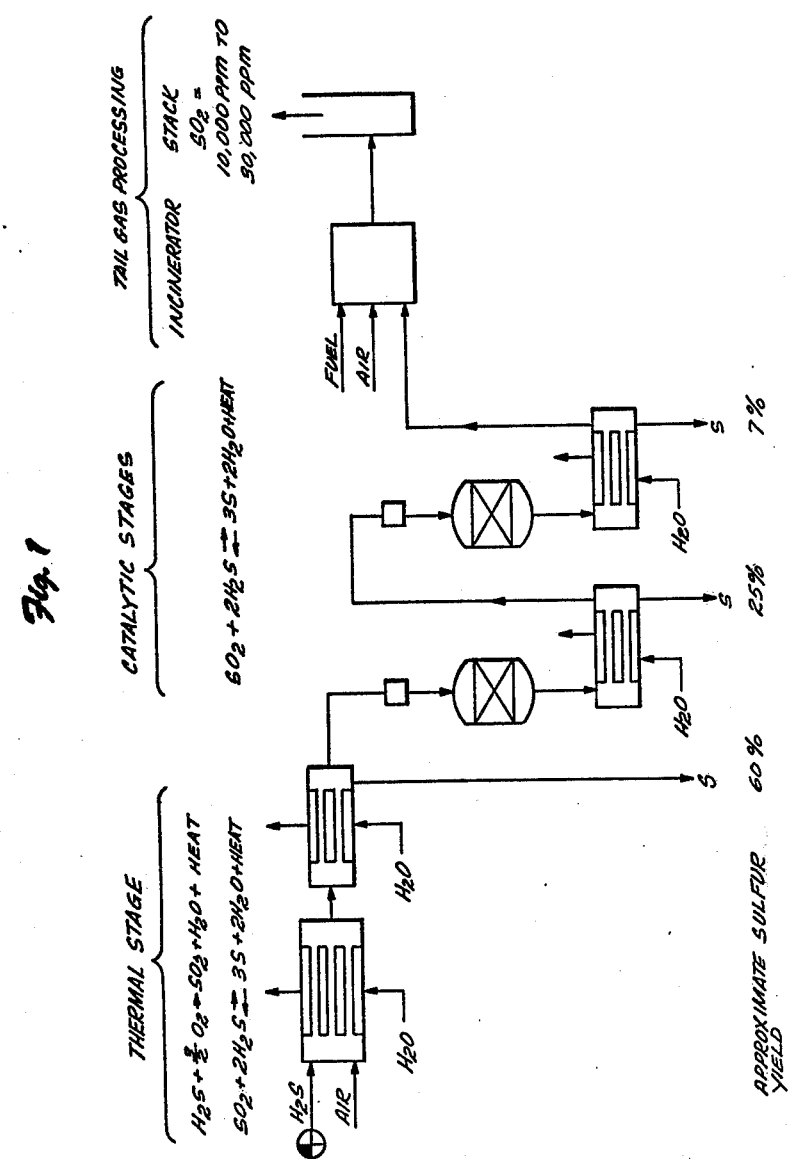
FIG. 1 is presented for illustrative purposes as showing the general scheme for the operation of the modified Claus process for sulfur production.

With reference to FIG. 1, the process of this invention is directed to the thermal reaction stage of a Claus process. More particularly, it is directed in the manner in which a feed gas stream containing hydrogen sulfide and substantial quantities of fixed nitrogen compound as well as a feed gas stream essentially free of fixed nitrogen compounds are combined with oxygen in the high temperature thermal reaction stage to achieve the initial formation of sulfur prior to passage of the gas stream to the catalytic Claus conversion stage while enabling complete conversion of the fixed nitrogen compounds to inert nitrogen.

In the operation of the practice of this invention, the thermal reaction stage immediately preceding the waste heat boiler illustrated in FIGS. 1, 4, 5 and 6 is divided into two separate and distinct reaction zones 10 and 12. In the first zone 10 there is fed a first hydrogen sulfide feed containing substantial quantities of fixed nitrogen compounds, a portion of a second hydrogen sulfide feed essentially free of fixed nitrogen compounds and oxygen, normally as air. The amount of oxygen supplied to the first reaction zone is insufficient for complete oxidation of the oxidizable constituents, primarily hydrogen sulfide. The total feed to the first zone is, however, sufficient to maintain the first thermal reaction zone at a temperature between about 2500° and 3000° F to achieve complete conversion of nitrogen in the fixed nitrogen compounds to inert nitrogen. This temperature is controlled by the amount of the second hydrogen sulfide feed fed to the first thermal reaction zone 10.

In the first thermal reaction zone 10, hydrogen sulfide is, to the extent of the available oxygen present, converted to sulfur dioxide; ammonia, to the extent present, to inert nitrogen and water and hydrogen cyanide, to the extent present, to inert nitrogen, carbon dioxide, and water.

In the preferred operation, residence time in the first thermal reaction zone is from about 0.2 to 1 second or more in order to achieve essentially complete decomposition of the fixed nitrogen compounds to inert nitrogen. At the same time, by employing suitable mixing within the first thermal reaction zone sulfur trioxide formation is kept to a minimum.

To maintain the desired reaction temperature, from about 33 to about 66 percent preferably 33 to 50 percent of the total hydrogen sulfide fed to the thermal reaction state is fed to the first thermal reaction zone.

The products of reaction from the first thermal reaction zone 10 are then passed to a second thermal reaction zone 12 where the balance of the second hydrogen sulfide feed is admixed with the effluent from the first thermal reaction zone and where sulfur is formed by the reaction of hydrogen sulfide and formed sulfur dioxide by reactions (9) and (10) above at a reduced temperature. Preferably the temperature in the second zone is less than 2500° F, and more preferably from about 1900° F to about 2500° F.

Again, to achieve a high degree of conversion intimate mixing is desired and residence time is again normally from about 0.2 to about 1 second.

The gas stream exiting the second thermal reaction zone is then passed through a waste heat boiler following which there is effected an intial sulfur recovery as illustrated in FIG. 1 and to the catalytic stages of the Claus process where hydrogen sulfide and sulfur dioxide combine to form sulfur by a catalytic reaction in the manner shown in FIG. 1.

In carrying out the process of this invention, not only is the problem of the formation of solid nitrogen-sulfur salts avoided, but sulfur troxide concentrations are maintained at minimum levels.

FIGS. 2 and 3 more directly illustrate the benefits of carrying out conversion in the first thermal reaction zone 10 in a deficiency of oxygen.

While the graphs shown are for a feed in which the molar ratio of hydrogen sulfide to ammonia to water is 1:1:1, a family of curves similar to that could be plotted for gas streams of other compositions.

To the left of point (B) of FIG. 2, represents the region where the gas stream is fed to the first thermal conversion zone with an excess of oxygen. Point (B) represents the point at which the stoichiometric quantity of oxygen required for the conversion of all the hydrogen sulfide fed to the first zone to sulfur dioxide is present and the region to the right of point (B) represents the region where excess hydrogen sulfide in the form of the second feed stream essentially free of fixed nitrogen compounds is employed to create a deficiency of oxygen in the first thermal reaction zone.

In the operation of a normal plant, while oxygen is added in quantities to satisfy the stoichiometry of reactions (7) and (8) above, the amount of oxygen actually added is that required to fit the thermodynamic equilibrium for the formation of some free hydrogen according to reaction (2).

Starting at an origin, if part of the first hydrogen sulfide feed containing the fixed nitrogen compounds, in this instance ammonia, is added to all of air required for the conversion of hydrogen sulfide to sulfur dioxide in the first reaction zone, the reaction temperature increases because of exothermic reactions (5) and (7) above. If all of the available first feed stream is added with some of the hydrogen sulfide feed essentially free of the fixed nitrogen compounds, the temperature will further increase to point (B) which is close to the stoichiometric portions of the oxygen required for reactions (5) and (7) and where nearly all the sulfur oxides exist as sulfur dioxide.

In the region to the left of point (B), although high temperatures can be maintained for the required decomposition of ammonia, if the temperature approaches stoichiometric, i.e. about 3100° F, a temperature will be reached which is close to the thermal breakdown of the firebrick used.

In the past, excess air has been employed over that required for reactions (5) and (7) above to maintain an operating temperature at about 2800° F. Free oxygen has been observed to be present in the effluent of the first reaction zone.

When operating under these conditions, it has been found, however, that plant efficiency with time is reduced due to the plugging of the catalytic converters and the final condenser resulting in a reduction of recovered free sulfur from 96.5 percent initially to 94.5 percent (operating efficiency). The loss of sulfur is attributed in part to the solid nitrogen-sulfur salts, e.g. ammonium sulfate, ammonium hydrosulfate and the like, which plug catalyst beds and the reaction train. In addition, at the high temperatures employed, namely at point (A), the excess oxygen present in the first thermal reaction zone resulted in unusually high concentrations of sulfur trioxide, the concentrations typically being about 130,000 parts per billion (ppb).

Operating to the right of point (B), in contrast, it was unexpectedly found that while temperatures remained the same, continuous operation could be maintained without the formation of the solid nitrogen-sulfur salts and with the sustained operating efficiency of 97.0 percent. This only resulted in a loss of only about 3 percent sulfur as sulfur dioxide instead of 5.5 percent, a reduction in air pollution potential of about 45 percent. No plugging problems were encountered over an extended period of test operation.

Operating at a deficiency of oxygen also was materially beneficial to the avoidance of sulfur trioxide formation. Operating at point (C) for instance, while the same conversion temperature, namely about 2800° F could be achieved, the amount of sulfur trioxide formed was only 300 parts per billion as compared to 130,000 parts per billion for point (A), a reduction by a factor of about 400.

With additional reference to FIG. 3, there is shown a plot of the logarithm of sulfur trixoide formation as a function of total hydrogen sulfide feed for the points shown in FIG. 2. They are summarized in Table 1 below.

Table I

| Point | Adiabatic Flame Temperature, ° F | $SO_3$ Conc. ppb |
|---|---|---|
| (A) | 2800 | 130,000 |
| (B) | 3100 | 4,800 |
| (C) | 2800 | 300 |
| (D) | 2100 | 23 |

As can be seen while operating with a deficiency of oxygen, a temperature sufficiently high for complete destruction of ammonia to prevent the formation of plugging salts, could be maintained while at the same time sulfur trioxide formation as is required for the formation of the salts from any ammonia which escapes destruction is minimized. Of the sulfur trioxide which was formed, a substantial quantity could be further eliminated by operating the second thermal reaction zone at temperatures below 2500° F.

To properly achieve the conversions to be carried out it was found desirable to employ a thermal reactor modified to achieve good gas mixing and to maintain the desired conversion temperatures in the first thermal reaction zone.

Figure 4:
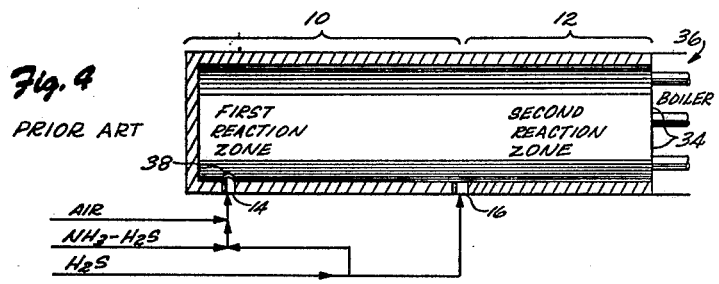
FIG. 4 illustrates a conventional split feed thermal reactor.

With reference to FIG. 4, there was first employed a simple tubular firebrick lined reactor having two reaction zones 10 and 12 as defined by inlet feeds 14 and 16. To feed inlet 14 there was fed oxygen as air, the first hydrogen sulfide feed containing substantial quantities of fixed nitrogen compounds and a portion of the hydrogen sulfide feed essentially free of the fixed nitrogen compounds. To the second reaction zone 12 defined by inlet point 16 there was fed the balance of the second hydrogen sulfide feed essentially free of the fixed nitrogen compound.

In the operation of this invention, it was found necessary to obtain good mixing and reaction in reaction zones 10 and 12. The conventional apparatus shown in FIG. 4 did not provide adequate mixing to insure that the secondary feed of hydrogen sulfide would reduce the sulfur trioxide inevitably formed in the first reaction zone according to reaction (10).

Figure 5:
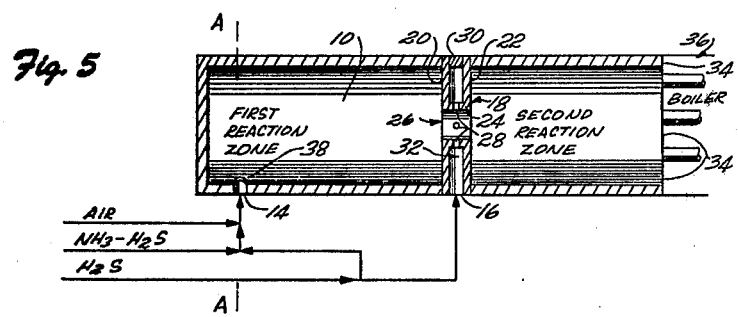
FIG. 5 illustrates the preferred thermal reactor for use in the process of this invention.

With reference to FIG. 5, the thermal reactor modified in accordance with the present invention which provides the best performance consists of adding to the tubular reactor shown in FIG. 4 at the point where the first reaction zone 10 is separated from the second reaction zone 12, an apertured hollow refractory internal ring 18 which forms a partition between the first reaction zone 10 and the second reaction zone 12. The hollow refractory ring 18 consists of a pair of spaced walls 20 and 22 connected by a conduit 24 through which the gas exits the first reaction zone 10 and enters the second reaction zone 12 under turbulent flow conditions through passageway 26.

Around the periphery of conduit 24 is contained a plurality of openings 28 which communicate between the exterior shell of ring 18 and gas flow conduit 26.

The external periphery of ring 18 is enclosed by a wall 30 typically the external wall of the reactor to form a manifold 32 where the gas entering at inlet 16 is allowed to be fed to the plurality of openings 28 communicating with gas flow conduit 26.

Turbulent flow through gas flow conduit 26 coupled with multiple injection of the second hydrogen sulfide feed entering through openings 28 insures thorough mixing of the gas stream passing from the first reaction zone 10 to the second reaction 12 with the second hydrogen sulfide feed entering through openings 28 prior to the mass reaction between sulfur dioxide and hydrogen sulfide which occurs in second reaction zone 12.

In order to achieve proper mixing the cross-sectional opening of gas flow conduit 26 is dimensioned, for the design flow rate of the feed through reaction zone 10, to achieve gas velocities of at least 30 ft. per second, typically in the order of 30–50 ft. per second.

By adding partition 18 to the thermal reactor to separate the first thermal reaction zone 10 from the second thermal reaction zone 12 affords several advantages.

First of all and particularly in the case of the instant invention, the first thermal reaction zone is operated in a deficiency of oxygen. As a consequence, heat energy must be conserved to the extent possible in order to maintain the high reaction temperatures to achieve complete elimination of the fixed nitrogen compounds.

Wall 20 of the first thermal reaction zone acts as a barrier to prevent the loss of radiant heat from the first thermal reaction zone 10. As it is preferably a refractory material, it serves as a radiating surface to radiate heat back into the first thermal reaction zone to insure the maintenance of high temperatures therein.

The second thermal reaction zone, in contrast, is to operate at lower temperatures to minimize the amount of sulfur trioxide exiting the second thermal reaction zone 12. This is brought about by the reaction of hydrogen sulfide in the second thermal reaction zone 12 with any sulfur dioxide formed in the first thermal reaction zone 10.

Since heat is conserved by the first thermal reaction zone 10 as a consequence of wall 20, second thermal reaction zone 12 conveniently operates at a lower temperature. In this instance, wall 22 serves as an insulating wall with the second hydrogen sulfide feed entering into space 32 between the walls acting to reduce heat transfer from wall 20 to wall 22.

Another important aspect of providing barrier 18 is to minimize the amount of heat radiated from the first thermal reaction zone 10 to the inlet walls 34 of the waste heat boiler 36.

In operating the thermal reactor as described in FIG. 5 it is highly desirable to achieve good mixing of reactants external to the inlet of the reactor. This, in part, prevents localized high concentrations of oxygen within reaction zone 10 which is conducive to the formation of sulfur trioxide.

Figure 7:
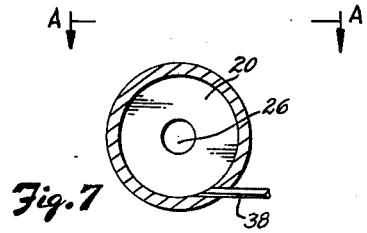
FIG. 7 illustrates the tangential inlet to the first thermal reaction zone.

Since residence time in the first thermal reaction zone is normally short, typically only from about 0.2 to about 1 second, external mixing is desired. Since the reactors are normally cylindrical in nature it is desirable to have the combined feed gas streams enter the thermal reaction zone 10 by a nozzle 38 communicating with the inlet 14, which, as illustrated in FIG. 7, is tangential to the interior walls of thermal reactor 10. The same embodiment can be applied for any cross-sectional configuration of the thermal reactor.

To achieve intimate mixing of reactants and insure uniform and complete reaction in the firs thermal reaction zone 10 it is desirable to have the feed to the first thermal reaction zone enter at a velocity of at least about 50 ft. per second and preferably at least about 100 ft. per second.

At will be appreciated, the nozzle used for the feed to the first thermal reaction zone 10 as well as the cross-sectional area of the partition 18 between the first reaction zone 10 and the second thermal reaction zone 12 are dimensioned based on the design feed rate for the reactor. For a cylindrical reactor of conventional dimensions, the opening formed by partition 18 between the first thermal reaction zone 10 and the second thermal reaction zone 12 will be about one-half of the cross-sectional area of the first thermal reaction zone 10 or less. The relative areas of the two will change, of course, depending upon the cross-sectional area configuration of the first thermal reaction zone 10.

Figure 6:
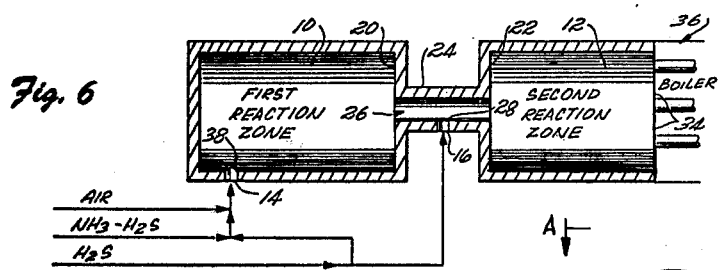
FIG. 6 illustrates an alternative thermal reactor for use in the process of this invention.

With reference to FIG. 6, there is provided an alternate embodiment to that shown in FIG. 5. Again, a flow conduit 26 is provided between the first thermal reaction zone 10 and the second thermal reaction zone 12 by means providing conduit 24.

The second feed of hydrogen sulfide enters flow conduit 24 by inlet 16 for intimate mixing with the high velocity turbulent gas stream flowing between the first thermal reaction zone 10 and second thermal reaction zone 12. The outlet wall 20 of first thermal reaction zone 10 conserves radiant energy within the first thermal reaction zone to maximize reaction temperature, while wall 22 confines the gas stream at a lower temperature in the second thermal reaction zone 12.

While representing a significant improvement over the thermal reactor shown in FIG. 4, it has been found in practice that the reactor shown in FIG. 6 is more costly than that shown in FIG. 5.

In using the thermal reactors shown in FIGS. 5 and 6, preferably FIG. 5, temperatures within the first thermal reaction zone 10 even with the deficiency of oxygen can be readily maintained at about 2800° F or more and below the degradation temperature of the refractory linings typically used, such that complete destruction of the fixed nitrogen compounds to inert nitrogen will occur within a time period of 0.2 to about 1 second.

To achieve reaction of formed sulfur dioxide with hydrogen sulfide as well as a diminution of any sulfur trioxide formed, residence time in the second thermal reaction zone will be the same as in the first. Within this residence time range of from about 0.2 to about 1 second sulfur trioxide concentrations at temperatures of about 2100° F can be reduced to a level of about 23 parts per billion which is well tolerable in the ensuing catalytic Claus conversion stages. This concentration is some 13 times less than the concentration of point (C), a typical operating temperature for the first thermal reaction zone 10.

What is claimed is:

1. In a thermal reactor for use in sulfur production consisting of a thermal reactor containing two thermal reaction zones in series, wherein the first thermal reaction zone has an inlet for feeding a first hydrogen sulfide feed and a source of oxygen thereto and wherein at least part of the hydrogen sulfide is converted to sulfur dioxide and wherein the second reaction zone has means associated therewith for feeding a second hydrogen sulfide feed thereto and wherein a portion of the formed sulfur dioxide reacts with hydrogen sulfide in the second thermal reaction zone to form sulfur, the improvement which comprises separating the first and second thermal reaction zones by a partition formed of a first transversely positioned planar apertured wall spaced from a second transversely positioned planar apertured wall, said planar walls being joined at their periphery to the external walls of said thermal reactor and extending radially inwardly therefrom, the first planar apertured wall serving a radiating surface to maintain a higher temperature in the first thermal reaction zone than the second thermal reaction zone, the respective apertures of said planar walls being interconnected by a gas flow conduit of a cross-sectional area which provides turbulent gas flow between said first and second thermal reaction zones, said partition being provided with means to introduce the second hydrogen sulfide feed into the gas flow conduit in the thermal reactor for turbulent mixing with the gas stream flowing from the first thermal reaction zone to the second reaction zone.

2. A thermal reactor as claimed in claim 1 in which said gas flow conduit is dimensioned to provide a mass gas velocity between said first and second thermal reaction zones of at least about 30 feet per second.

3. A thermal reactor as claimed in claim 1 which includes means to mix the first hydrogen sulfide feed and source of oxygen external to the thermal reactor and introduce the mixture into the first thermal reaction zone tangentially to an axial wall of the first thermal reaction zone at a velocity of at least about 50 feet per second.

4. A thermal reactor as claimed in claim 1 in which the means to introduce the second hydrogen sulfide feed to the gas stream flowing from the first thermal reaction zone to the second thermal reaction zone comprises:
  a. a plurality of openings in said gas flow conduit extending from the exterior surface of the gas flow conduit to the interior surface of the gas flow conduit; and
  b. a manifold surrounding the said plurality of openings for feed of the second hydrogen sulfide feed to the said openings.

5. A thermal reactor as claimed in claim 4 in which the gas flow conduit is dimensioned to provide a mass gas velocity of at least about 30 feet per second between said first and second thermal reaction zones.

6. A thermal reactor as claimed in claim 5 which includes means to mix the first hydrogen sulfide feed and source of oxygen external to the thermal reactor and introduce the mixture into the first thermal reaction zone tangentially to an axial wall of the first reaction zone at a velocity of at least about 50 feet per second.

7. A thermal reactor for use in sulfur production which comprises:
  a. a first refractory lined thermal reaction zone for reaction of a first feed of hydrogen sulfide and a source of oxygen to form sulfur dioxide, said first thermal reaction zone having feed inlet at one end thereof for a premixed feed of the first hydrogen sulfide feed and the source of oxygen to the first thermal reaction zone, and at the opposed end thereof, a first transversely-positioned planar apertured refractory wall providing a radiating surface for maximation of temperature in said first thermal reactor zone and providing an outlet for the reaction products formed in the first thermal reaction zone;
  b. a second thermal reaction zone having an inlet formed of a second planar transversely-positioned apertured refractory wall spaced from the first planar apertured refractory wall to define a second thermal zone for operation at a lower temperature than the first thermal reaction zone and means for communication with a waste heat boiler;
  c. a gas flow conduit connecting the apertures of said first and second planar refractory walls forming a turbulent gas flow path between said first and second thermal reaction zones, said gas flow conduit having a plurality of openings around the periphery thereof and a manifold connection to a second hydrogen sulfide feed surrounding said openings for feed of a second hydrogen sulfide feed through the plurality of openings to the gas flowing from said first thermal reaction zone to said second thermal reaction zone.

8. A thermal reactor as claimed in claim 7 in which the said gas flow conduit is dimensioned to provide a mass gas velocity of at least about 30 feet per second between said first and second thermal reaction zones.

9. A thermal reactor as claimed in claim 7 in which the feed inlet includes means to introduce the premixed feed of hydrogen sulfide and source of oxygen to the first thermal reaction zone at a mass velocity of at least about 50 feet per second and tangential to an axial wall of said first thermal reaction zone.

* * * * *

UNITED STATES PATENT AND TRADEMARK OFFICE
CERTIFICATE OF CORRECTION

PATENT NO. : 4,038,036
DATED : July 26, 1977
INVENTOR(S) : David K. Beavon

It is certified that error appears in the above-identified patent and that said Letters Patent are hereby corrected as shown below:

Column 2, line 48, change "$2\ NH_3 + 32\ O_2 \rightarrow N_2 + 3\ H_2O$" to read -- $2\ NH_3 + \frac{3}{2} O_2 \longrightarrow N_2 + 3\ H_2O$ --.

Column 6, line 27, "troxide" should read -- trioxide --.
Column 9, line 36, "firs" should read -- first --;
Column 9, line 42, "At" should read -- As --.

Signed and Sealed this

*Seventh* Day of *February 1978*

[SEAL]

*Attest:*

RUTH C. MASON
*Attesting Officer*

LUTRELLE F. PARKER
*Acting Commissioner of Patents and Trademarks*